United States Patent
Budmiger

(10) Patent No.: US 7,921,736 B2
(45) Date of Patent: Apr. 12, 2011

(54) MAGNETO-INDUCTIVE FLOW MEASURING DEVICE

(75) Inventor: Thomas Budmiger, Ettingen (CH)

(73) Assignee: Endress + Hauser Flowtec AG, Reinach (CH)

( * ) Notice: Subject to any disclaimer, the term of this patent is extended or adjusted under 35 U.S.C. 154(b) by 258 days.

(21) Appl. No.: 11/921,649

(22) PCT Filed: May 11, 2006

(86) PCT No.: PCT/EP2006/062240
§ 371 (c)(1),
(2), (4) Date: Jan. 12, 2009

(87) PCT Pub. No.: WO2006/136482
PCT Pub. Date: Dec. 28, 2006

(65) Prior Publication Data
US 2009/0266176 A1    Oct. 29, 2009

(30) Foreign Application Priority Data
Jun. 20, 2005   (DE) .................. 10 2005 028 723

(51) Int. Cl.
*G01F 1/58*      (2006.01)
(52) U.S. Cl. .................. 73/861.13; 73/861.12
(58) Field of Classification Search .................. None
See application file for complete search history.

(56) References Cited

U.S. PATENT DOCUMENTS
4,490,678 A   12/1984   Kuisl
5,677,496 A   10/1997   Mochizuki
(Continued)

FOREIGN PATENT DOCUMENTS
DE   103 46 409 A1    5/2005
EP    1 249 687 A2   10/2002
WO   WO 2006/136482 A1   12/2006
(Continued)

OTHER PUBLICATIONS

Von K. W. Bonfig, Elektrochemische Storspannungen an den Elektroden bei der induktiven Durchflußmessung, (ATM) Archiv fur technisches Messen, Jul. 1971, pp. 135-138.

(Continued)

*Primary Examiner* — Harshad Patel
(74) *Attorney, Agent, or Firm* — Bacon & Thomas, PLLC

(57) ABSTRACT

The invention relates to a magneto-inductive flow measuring device (1), including: A measuring tube (2), through which a medium (11) flows essentially in a direction of a measuring tube axis (16); a magnet arrangement (6, 7), which produces a magnetic field (H) passing through the measuring tube (2) and extending essentially perpendicularly to the measuring tube axis (16); a first measuring electrode (3) and a second measuring electrode (4); wherein the measuring electrodes (3, 4) are positioned in the measuring tube (2) on a connecting line, which is directed essentially perpendicularly to the measuring tube axis (16) and to the magnetic field (H); and an evaluation/control unit (12), which ascertains, on the basis of a measurement voltage tapped on the measuring electrodes (3, 4), the volume- and/or mass-flow of the medium (11) through the measuring tube (2).

In order to increase the measuring accuracy of the multi-parameter flow measuring device (1), the first measuring electrode (3) is made of a first material (A) and the second measuring electrode (4) is made of a second material (C) different from the first material (A); the control/evaluation unit (12) ascertains the direct voltage portion ($U_D$) of the voltages ($U_3$, $U_4$) tapped on the two measuring electrodes (3, 4) relative to a reference potential ($\Phi_R$), and makes available, on the basis of the direct voltage portion ($U_D$), medium-specific information.

15 Claims, 3 Drawing Sheets

U.S. PATENT DOCUMENTS

| | | | |
|---|---|---|---|
| 6,807,867 | B2 | 10/2004 | Brockhaus |
| 7,068,054 | B2 * | 6/2006 | Chedid et al. .................. 324/717 |
| 7,093,502 | B2 * | 8/2006 | Kupnik et al. ............. 73/861.29 |
| 2002/0145417 | A1 * | 10/2002 | Brockhaus .................... 324/204 |

OTHER PUBLICATIONS

Rainer Kraft and Thomas Budmiger, Erweiterte Diagnose bei magnetisch-induktiven Durchflussmessgeraten, 2001, pp. 50-54.

* cited by examiner $U_D = \phi_3 - \phi_4$ or $U_D = (\phi_3 - \phi_R) - (\phi_4 - \phi_R) = \phi_3 - \phi_4$

MAGNETO-INDUCTIVE FLOW MEASURING DEVICE

TECHNICAL FIELD

The invention relates to a magneto-inductive flow measuring device, including: A measuring tube, through which a medium flows essentially in the direction of the measuring tube axis; a magnet arrangement, which produces an alternating magnetic field passing through the measuring tube and directed essentially perpendicularly to the axis of the measuring tube; a first measuring electrode and a second measuring electrode; wherein the measuring electrodes are positioned in the measuring tube on a connecting line, which is directed essentially perpendicularly to the axis of the measuring tube and to the magnetic field; and a control/evaluation unit, which, on the basis of the measurement voltage tapped from the measuring electrodes, determines the volume and/or mass flow, e.g. flow rate, of the medium through the measuring tube.

BACKGROUND DISCUSSION

Magneto-inductive flow measuring devices utilize the principle of electrodynamic induction for measuring volumetric flow: Charge carriers of the medium moved perpendicular to a magnetic field induce a voltage in measuring electrodes arranged likewise essentially perpendicularly to the direction of flow of the medium. This measurement voltage induced in the measuring electrodes is proportional to the flow velocity of the medium averaged over the cross section of the measuring tube; it is, thus, proportional to the volume flow rate. In the case of known density of the medium, it is then also possible to ascertain the mass flow of the medium flowing through the measuring tube. The measuring electrodes are usually coupled with the medium either galvanically or capacitively.

U.S. Pat. No. 5,677,496 and EP 1 249 687 A1 disclose that, besides the alternating voltage relevant for the actual flow measurement, also appearing on the measuring electrodes is a direct voltage portion caused by disturbance potentials. In order to take into consideration the influence of these disturbance potentials, voltages are sensed on the two measuring electrodes relative to a reference potential. The reference potential is usually ground- or earth-potential. Then, a value for the direct voltage portion of the voltage tapped on the two measuring electrodes relative to the reference potential is ascertained. In U.S. Pat. No. 5,677,496, the direct voltage portion is used for correcting the actual measurement voltage signal. In this way, a voltage value is obtained, which, now no longer error laden, is a direct measure for the volume flow of the medium through the measuring tube.

Additionally provided in EP 1 249 687 A1 is an output system, with which a value for the direct voltage portion of the voltages sensed on the two measuring electrodes, in each case relative to the reference potential, is made available to the user for further processing. This solution has, moreover, been implemented since the year 2000 in the PROMAG 50/53 flow measuring device offered and sold by the present assignee. Additionally described in EP 1 249 687 A1 is a method for ascertaining, with the help of the direct voltage portions of the voltages sensed on the measuring electrodes relative to the reference potential, the pH-value of the medium.

Problematic in the case of the method disclosed in EP 1 249 687 A1 is the constancy of the reference potential needed for a sufficiently high accuracy of measurement. As described in EP 1 249 687 A1, the electrochemical disturbance voltage is measured relative to the reference potential, especially relative to earth-potential. Inherent in this is that the quality of the pH-value measurement stands and falls with the constancy of the reference potential. Calibration of magneto-inductive measuring devices occurs, usually, not on-site, but, instead, before shipping, at the production site. If, for example, the connection pipelines used during calibration of the measuring device differ from the connection pipelines used later during operation of the flow measuring device at the measuring site, then the reference potential changes in an undefined manner, since the reference potential is influenced not only by the material of the reference electrode, but also by the material of the pipeline inlet and outlet. For the pH-value measurement, this means that the issued pH-value is burdened with a large measurement error, thus being more an estimate than a reliable, measured value.

SUMMARY OF THE INVENTION

An object of the invention is to so embody a magneto-inductive flow measuring device, that the electrochemical, disturbing voltage present on the measuring electrodes of the flow measuring device is independent of the reference potential.

The object is achieved in a first form of embodiment of the magneto-inductive flow measuring device of the invention by features including that the first measuring electrode comprises a first material A, the second measuring electrode comprises a second material C different from the first material A, the control/evaluation unit ascertains the direct voltage portion of the voltages sensed on the two measuring electrodes, in each case, relative to a reference potential, and the control/evaluation unit makes medium-specific information available on the basis of the direct voltage portion. Preferably, the reference potential is earth potential.

The object is achieved in a second form of embodiment of the magneto-inductive flow measuring device of the invention by features including that the first measuring electrode comprises a first material A, the second measuring electrode comprises a second material C different from the first material A, the control/evaluation unit ascertains the direct voltage difference between the two measuring electrodes, and the control/evaluation unit makes available medium-specific information on the basis of the direct voltage difference. For making the measurement error smaller, in an advantageous further development of the flow measuring device of the invention, the control/evaluation unit can average the direct voltage portion, or the direct voltage difference, over a plurality of measuring periods.

In an advantageous further development of the magneto-inductive flow measuring device of the invention, the medium-specific information involves a physical variable or an electrochemical variable. In the case of an electrochemical variable, preferably ion concentration, an electrochemical potential or the pH-value of the medium is ascertained. Examples of a physical variable include information concerning the impedance or the conductivity of the medium flowing through the measuring tube.

Especially advantageous in connection with the present invention is when, on the basis of historical data, information on changes at the measuring device or in the process are made available. To this end, in an embodiment of the magneto-inductive flow measuring device of the invention, a memory unit is provided, in which the ascertained, medium-specific information, or the information concerning the direct voltage portion, is stored as a function of time; on the basis of change over time of the medium-specific information, a report is made available, which is correlated with a correspondingly predetermined change at the flow measuring device or in the process. Especially stored in the memory unit is at least one desired value for the medium-specific information; if the measured or ascertained, actual value exceeds or falls beneath the desired value or exceeds or falls beneath a tolerance range about the desired value, then a corresponding report is issued, stored or forwarded to a superordinated, control facility.

The invention will now be explained in more detail on the basis of the drawing, the figures of which show as follows:

DETAILED DESCRIPTION

Figure 1A:
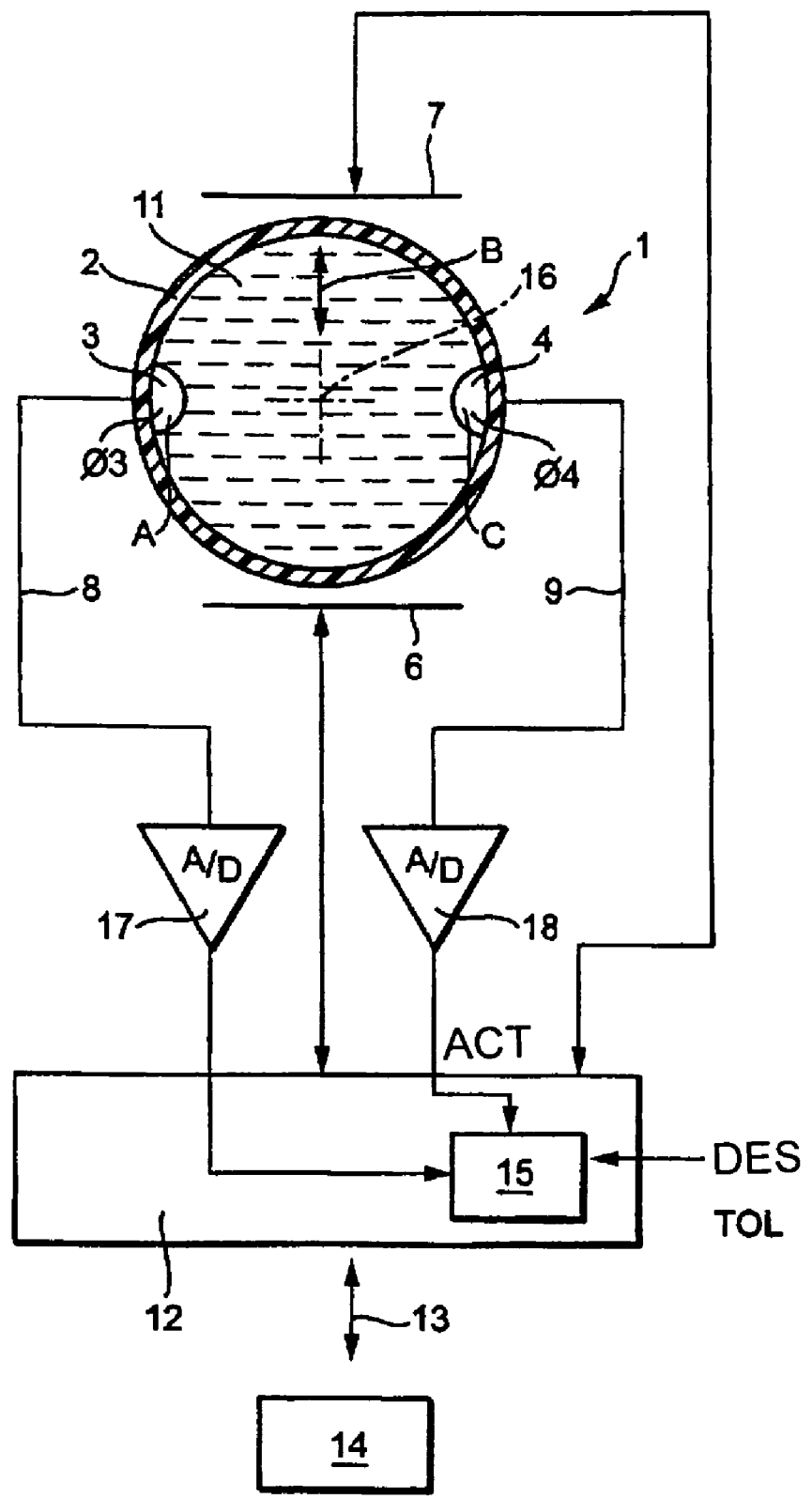
FIG. 1a is a schematic illustration of a magneto-inductive flow measuring device of the invention without a reference electrode
Figure 1B:
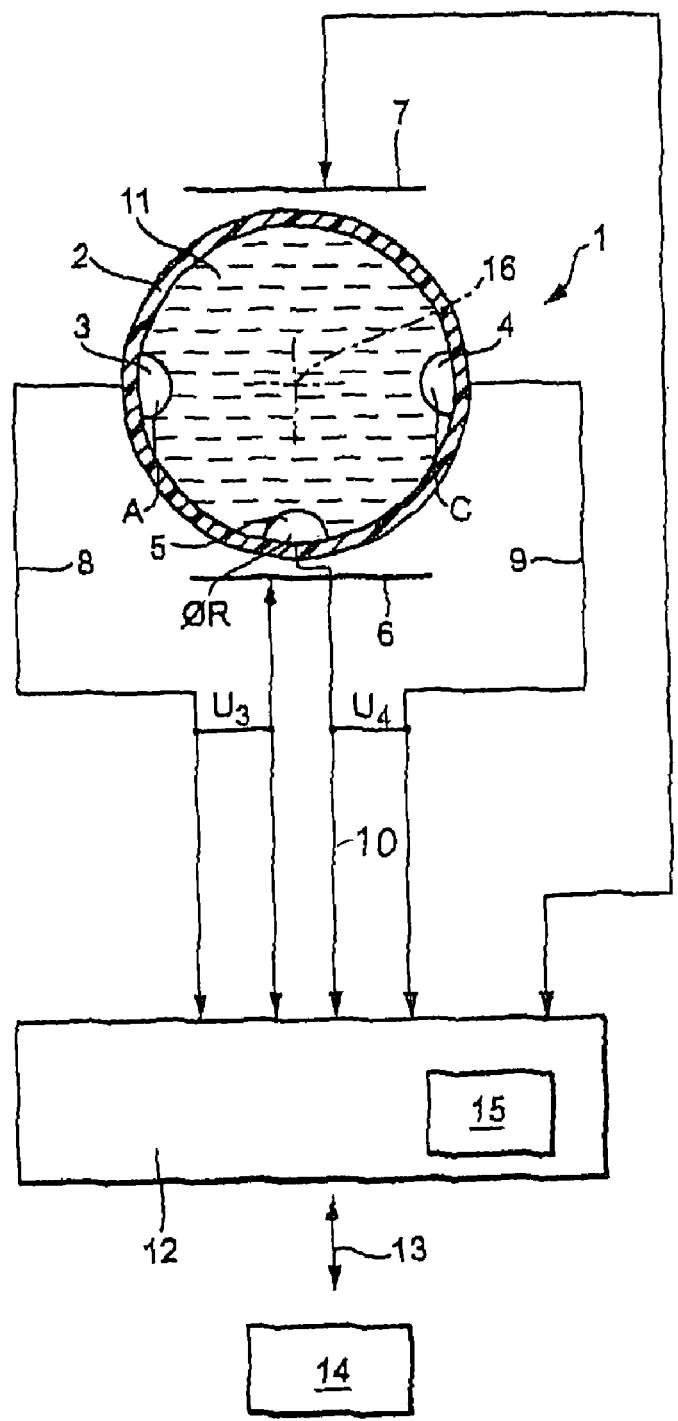
FIG. 1b is a schematic illustration of a magneto-inductive flow measuring device of the invention with reference electrode.

FIGS. 1a and 1b are schematic drawings of magneto-inductive flow measuring devices of the invention. While, in FIG. 1a, an embodiment is presented without reference electrode, FIG. 1b shows an embodiment with a reference electrode 5. Since this is, fundamentally, the only difference, attention in the following will be directed to the embodiment of FIG. 1a.

Flow measuring device 1 includes a measuring tube 2, through which a medium 11 flows in the direction of the measuring tube axis 16. In order to be able to make use of the magneto-inductive measuring principle, the medium 11 is at least slightly electrically conductive, while measuring tube 2 is made of an electrically non-conductive material, or is at least lined internally with a non-conductive material.

Arranged in the two lateral regions of the measuring tube 2 are the two, diametrally opposed, measuring electrodes 3, 4. According to the invention, the two measuring electrodes 3, 4 are made of, or are coated with, different materials, materials A and C. If present (FIG. 1b), the reference electrode 5, which lies preferably at a ground- or earth-potential, is located in the lower region of the measuring tube 2.

As a result of the alternating magnetic field B directed essentially perpendicularly to the flow direction of the medium 11 and produced by the two diametrally opposed electromagnets 6, 7, charge carriers located in the medium 11 migrate to the oppositely poled, measuring electrodes 3, 4. The measurement voltage U which is established on the measuring electrodes 3, 4 is proportional to the flow velocity of the medium 11 averaged over the cross section of the measuring tube 2, i.e. it is a measure for the volume flow rate of the medium 11 in the measuring tube 2. The measurement voltage U is tapped either between the two measuring electrodes 3, 4 or between the two measuring electrodes 3, 4, respectively, and the reference electrode 5 (FIG. 1b), with, in the last case, the reference potential being dropped out of the equation by taking the difference between the two measurements. A measurement amplifier arrangement for a magneto-inductive flow measuring device 1 is described in EP 0 814 324 B1.

Measuring tube 2 is connected into the pipeline using connecting elements, e.g. flanges (not shown), with one side of the pipeline providing the feed for the measuring tube and the other side the drain.

Figure 2:
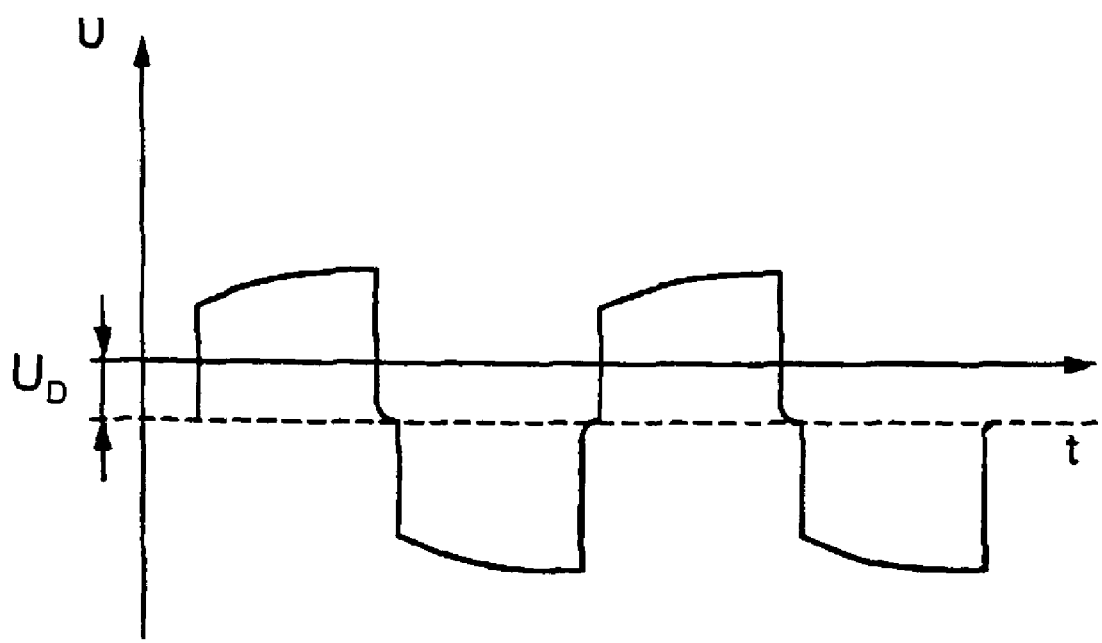
FIG. 2 is a schematic drawing of the voltage tapped on the measuring electrodes.

As evident from FIG. 2, there is, on the measuring electrodes 3, 4, besides the actual, alternating, measurement voltage U(t) relevant for the flow measurement, also a direct voltage portion $U_D$ formed by electrochemical and, thus, medium-dependent, disturbing potentials. The direct voltage portion $U_D$ is superimposed on the actual measurement voltage U(t). In order to measure the influence of the disturbing potentials, or the direct voltage portion $U_D$, measurement voltages $U_3(t)$, $U_4(t)$, respectively, on the two measuring electrodes 3, 4 are sensed between the measuring electrodes 3, 4, respectively, and the reference electrode 5. Then, in the control/evaluation unit 12, the difference between the two ascertained measurement voltages $U_3(t)$, $U_4(t)$ is formed (FIG. 1b). Due to the difference forming, i.e. $U_3(t)-U_4(t)$, the reference potential $\Phi_R$ drops out, so that the measurement voltage U(t) corresponds to the difference of the two measuring electrode potentials $\Phi_3-\Phi_4$. Consequently, the actual measured value, which is used for ascertaining the volume flow and the electrochemical, or physical, variable, is independent of the reference potential $\Phi_R$. The reference potential $\Phi_R$ is usually the ground- or earth-potential. Alternatively, the voltage between the two measuring electrodes 3, 4 is registered (FIG. 1a). Uncontrolled changes of the reference potential $\Phi_R$, for example as a result of the character of the pipeline system at the site of installation (e.g. the pipeline system is made of another material than the measuring tube 2) have, consequently, no effect on the measuring accuracy of the multi-parameter flow measuring device 1.

In the two illustrated variants of the flow measuring device 1 of the invention, the measuring electrodes 3, 4, and the reference electrode 5, in the case where such is present, are in direct contact with the medium.

The measuring electrodes 3, 4, and the reference electrode 5, in the case where such is present, are connected with the control/evaluation unit 12 via connecting lines 8, 9, 10. The control/evaluation unit 12 is connected with an output unit 14 via the connecting line 13. Additionally, the pole reversal of the magnetic field B, i.e. the electromagnets 6, 7, is accomplished via the control/evaluation unit 12.

Associated with the control/evaluation unit 12 is a memory unit 15. In the control/evaluation unit 12, a desired value DES is specified for at least one physical or electrochemical variable, and, where appropriate, also for different media 11. The desired value DES, or the desired values DES, of the relevant physical or electrochemical variable(s) can also be specified at the time of startup of the device, by storing, as the desired value DES, the actual value ACT measured at such time. If the measured, actual value ACT changes in the course of time, then, from the change, conclusions can be drawn regarding changes at the flow measuring device 1 or in the process. If e.g. the pH-value changes abruptly, then this is an indication that the composition of the medium 11, or the medium 11 itself, has changed. The same is true as regards an abrupt change in the conductivity, while, in contrast, a creeping change would point to a fouling of the measuring electrodes. If the arising deviation lies outside of a predetermined tolerance TOL, then a corresponding report is issued at the display unit 14. Alternatively, a warning can be sent via a bus to a superordinated control room.

The invention claimed is:

1. A magneto-inductive flow measuring device comprising:
   a measuring tube, through which a medium flows essentially in a direction of a measuring tube axis;
   a magnet arrangement, which produces a magnetic field passing through said measuring tube and extending essentially perpendicularly to said measuring tube axis;

a first measuring electrode;

a second measuring electrode, said measuring electrodes are positioned in said measuring tube on a connecting line, which is directed essentially perpendicularly to said measuring tube axis and to the magnetic field; and an evaluation/control unit, which ascertains, on the basis of a measurement voltage tapped on said measuring electrodes, the volume- and/or mass-flow of the medium through said measuring tube; wherein:

said first measuring electrode comprises a first material, and said second measuring electrode comprises a second material different from the first material; and said control/evaluation unit ascertains the direct voltage portion of the voltages tapped on said two measuring electrodes relative to a reference potential, and said control/evaluation unit makes available, on the basis of said direct voltage portion, medium-specific information.

2. The magneto-inductive flow measuring device as claimed in claim 1,
wherein:
said reference potential is earth potential.

3. The magneto-inductive flow measuring device as claimed in claim 1, wherein:
said control/evaluation unit averages the direct voltage portion, or the direct voltage difference, over a plurality of measuring periods.

4. The magneto-inductive flow measuring device as claimed in claim 1, wherein:
the medium-specific information concerns a physical variable or an electrochemical variable.

5. The magneto-inductive flow measuring device as claimed in claim 4, wherein:
the electrochemical variable is one of: an ion concentration, an electrochemical potential and a pH-value of the medium.

6. The magneto-inductive flow measuring device as claimed in claim 4, wherein:
the physical variable is impedance or conductivity of the medium flowing through said measuring tube.

7. The magneto-inductive flow measuring device as claimed in claim 1, further comprising:
a memory unit, in which the ascertained medium-specific information is stored as a function of time, and wherein:
said control/evaluation unit provides, on the basis of a time change of the medium specific information, a report correlated with a correspondingly specified change at the flow measuring device or in the process.

8. The magneto-inductive flow measuring device as claimed in claim 7, further comprising:
a display unit, wherein:
at least one desired value for the medium-specific information is stored in said memory unit; and
said display unit issues a report, when the measured or registered, actual value exceeds or falls beneath the desired value or a tolerance specified around the desired value.

9. A magneto-inductive flow measuring device, comprising:
a measuring tube, through which a medium flows essentially in a direction of a measuring tube axis;
a magnet arrangement, which produces a magnetic field passing through said measuring tube and extending essentially perpendicularly to said measuring tube axis;
a first measuring electrode;
a second measuring electrode, said measuring electrodes are positioned in said measuring tube on a connecting line, which is directed essentially perpendicularly to said measuring tube axis and to said magnetic field; and
an evaluation/control unit, which ascertains, on the basis of a measurement voltage tapped on said measuring electrodes, the volume- and/or mass-flow of the medium through said measuring tube, wherein:
said first measuring electrode comprises a first material, and
said second measuring electrode comprises a second material different from the first material; and
said control/evaluation unit ascertains the direct voltage difference between said two measuring electrodes, and makes available, on the basis of the direct voltage difference, medium-specific information.

10. The magneto-inductive flow measuring device as claimed in claim 9, wherein:
said control/evaluation unit averages the direct voltage portion, or the direct voltage difference, over a plurality of measuring periods.

11. The magneto-inductive flow measuring device as claimed in claim 9, wherein:
the medium-specific information concerns a physical variable or an electrochemical variable.

12. The magneto-inductive flow measuring device as claimed in claim 11, wherein:
the electrochemical variable is one of: an ion concentration, an electrochemical potential and a pH-value of the medium.

13. The magneto-inductive flow measuring device as claimed in claim 11, wherein:
the physical variable is impedance or conductivity of the medium flowing through said measuring tube.

14. The magneto-inductive flow measuring device as claimed in claim 9, further comprising:
a memory unit, in which the ascertained medium-specific information is stored as a function of time, and wherein:
said control/evaluation unit provides, on the basis of a time change of the medium specific information, a report correlated with a correspondingly specified change at the flow measuring device or in the process.

15. The magneto-inductive flow measuring device as claimed in claim 14, further comprising:
a display unit, wherein:
at least one desired value for the medium-specific information is stored in said memory unit; and
said display unit issues a report, when the measured or registered, actual value exceeds or falls beneath the desired value or a tolerance specified around the desired value.

* * * * *